ial-forming polymerization initiator and a polymerization regulator at a temperature of from 50° to 350° C. and a pressure of from 1000 to 4000 atmospheres.

United States Patent Office 3,835,107
Patented Sept. 10, 1974

3,835,107
PRODUCTION OF LOW MOLECULAR WEIGHT WAXY POLYETHYLENES
Kurt Stark, Heidelberg, Hans Gropper, Ludwigshafen, and Friedrich Urban and Helmut Pfannmueller, Limburgerhof, Germany, assignors to Badische Anilin- & Soda-Fabrik Aktiengesellschaft, Ludwigshafen (Rhine), Germany
No Drawing. Continuation of abandoned application Ser. No. 79,300, Oct. 8, 1970. This application Sept. 25, 1972, Ser. No. 291,671
Int. Cl. C08f 1/60, 3/04
U.S. Cl. 260—94.9 R                                    5 Claims

ABSTRACT OF THE DISCLOSURE

A process for the production of waxy, low molecular weight polyethylenes in which ethylene is polymerized under the action of a polymerization initiator which forms free radicals and in the presence of a polymerization regulator at elevated temperature and at superatmospheric pressure. It is a characteristic of the process according to the invention that as the free radical-forming polymerization initiator there are jointly used:

(1) a specific amount of an organic peroxide having a half-life temperature of from 60° to 112° C.; and
(2) a specific amount of oxygen. High yields can be obtained by the process and a product can be obtained which has particularly good oil-binding properties.

This application is a continuation of application Ser. No. 79,300, filed Oct. 8, 1970, now abandoned.

The present invention relates to a process for the production of waxy, low molecular weight polyethylenes in which ethylene is polymerized under the action of a free radical-forming polymerization initiator and a polymerization regulator at a temperature of from 50° to 350° C. and a pressure of from 1000 to 4000 atmospheres.

It is known that organic peroxides having a half-life temperature of from 60° to 112° C. may be used as free radical-forming polymerization initiators (cf. for example the specification of Belgian Pat. No. 554,173 which has been laid open to public inspection). The use of such peroxides having relatively low half-life temperatures results in the products (the waxes) having a high density and a melting range which is at high temperatures; it is a drawback however that the waxes have relatively poor oil-binding properties and that the yield of waxes (based on the ethylene used) is uneconomically low.

An object of the present invention is to provide a process of the type defined above by which it is possible to prepare waxes in high i.e. economical, yields which are distinguished not only by a high density and a melting range which is at high temperatures, but also by good oil-binding properties.

We have found surprisingly that the said object can be achieved by the joint use of (1) an organic peroxide having a half-life temperature of 60° to 112° C. and
(2) oxygen as the free radical-forming polymerization initiator.

Accordingly, the present invention relates to a process for the production of waxy, low molecular weight polyethylenes in which ethylene is polymerized under the action of a free radical-forming polymerization initiator and a polymerization regulator at a temperature of from 50° to 350° C., preferably from 80° to 300° C., and a pressure of 1000 to 4000 atmospheres, preferably 1300 to 3000 atmospheres, wherein there are used conjointly as the free radical forming polymerization initiator, (1) from 3 to 150, preferably from 5 to 80, moles (per million moles of ethylene) of an organic peroxide having a half-life temperature of from 60° to 112° C. and
(2) from 5 to 250, preferably 10 to 120, parts by volume (per million parts by volume of ethylene) of oxygen.

The term "half-life temperature" (HLT) as used herein is defined as the temperature at which, using any given amount of peroxide, half has been decomposed in one minute.

Organic peroxides having a half-life temperature (HLT) of from 60° to 112° C. are used in the process according to the invention. Examples of suitable peroxides of this type are organic peroxydicarbonates such as diisopropyl peroxydicarbonate (HLT=90° C.), dicyclohexyl peroxydicarbonate (HLT=90° C.), di-p-tertiary-butylcyclohexyl peroxydicarbonate (HLT=90° C.); acetylcyclohexanesulfonyl peroxide (HLT=65° C.); peresters such as tertiary-butyl peroxypivalate (HLT=112° C.); the latter peroxide gives particularly good results. The peroxide may be used in the process either alone or in admixture with each other.

Oxygen to be used in the process according to the invention may be particularly in the form of air.

The process as such, having regard to the peculiarities in accordance with the invention, may be carried out by conventional methods using conventional equipment (cf. for example East German Pat. No. 52,218 and French Pat. No. 1,566,894).

Conventional polymerization regulators are suitable for the process, for example hydrogen, ethane, propane, n-butane and isobutane; the regulators may be used in conventional amounts, i.e. advantageously from 2.5 to 15.0 parts by volume of hydrogen per 100 parts by volume of ethylene or advantageously from 1.5 to 18.0 parts by volume the other said regulators per 100 parts by volume of ethylene. Mixtures of the said regulators are however also suitable. Hydrogen and mixtures of predominant amount of hydrogen and minor amounts of another of the said regulators are particularly suitable.

Waxes obtainable by the process according to the invention are suitable for conventional purposes, for example for coating paper, as a component of dry-bright emulsions and corrosion inhibitors.

In the following Examples, the polymerization apparatus is a tubular reactor such as is conventionally used in the continuous high pressure polymerization of ethylene. The ratio of the diameter of the reaction tube to its length is 1:14,000. The reaction tube is surrounded by a jacket tube for a heat transfer medium. The jacket tube in turn is subdivided into two independently operable zones of which the first extends over two-fifths of the length of the tube (zone (I)) and the second extends over the remaining three-fifths of the length of the tube (zone (II)). A valve which is provided at the end of the reaction tube serves (a) to regulate the pressure in the polymerization chamber and (b) to discharge the reaction product. A conventional high-pressure separator and a conventional low-pressure separator are arranged downstream of the valve for the separation of the low molecular weight waxy polyethylene from the unpolymerized substances, i.e. mainly from the portion of ethylene which has not taken part in the polymerization.

The parts given in the Examples are parts by weight unless otherwise stated. Hardness is determined by means of a Höppler consistometer according to the standard method of Deutsche Gesellschaft für Fettwissenschaft e.v., Münster, Germany, consistency M III 9 a.

EXAMPLE 1

The reactor is charged at the inlet end with a mixture compressed to 2300 atmospheres and consisting of (a) 1000 parts per hour of ethylene;
(b) 25 moles per hour of tertiary-butyl peroxypivalate per million moles of ethylene;
(c) 21 parts by volume per hour of oxygen per million parts by volume of ethylene; and
(d) 6.5 parts by volume per hour of hydrogen (regulator) per hundred parts by volume of ethylene.

The heat transfer medium is kept at a constant temperature of 130° C. in zone (I) of the reactor jacket and at 190° C. in zone (II). The reaction mixture reaches a temperature of about 210° C. as a result of the heat of reaction liberated.

170 parts per hour of a waxy low molecular weight polyethylene is obtained. Its physical data are:

| | |
|---|---|
| Mean molecular weight | 5800 |
| Softening range °C | 115 to 117 |
| Hardness (depth of penetration) mm | 0.15 |
| Density g./ccm | 0.948 |
| Oil-binding properties | Good |

Comparative Experiment

The procedure of Example 1 is followed exactly except that 40 moles per hour of tertiary-butyl peroxypivalate is used per million moles of ethylene and no oxygen is present.

Only 90 parts per hour of a waxy low molecular weight polyethylene is obtained which moreover has unsatisfactory oil-binding properties.

EXAMPLE 2

The reactor is fed at the inlet end with a mixture compressed to 2300 atmospheres and consisting of (a) 1000 parts per hour of ethylene;
(b) 10 moles per hour of tertiary-butyl peroxypivalate per million moles of ethylene;
(c) 35 parts by volume per hour of oxygen per million parts by volume of ethylene; and
(d) 8.2 parts by volume per hour of hydrogen (regulator) per hundred parts by volume of ethylene.

The heat transfer medium in the first zone of the reactor jacket is kept at a constant temperature of 135° C., and in zone (II) at 195° C. The reaction mixture reaches a temperature of about 225° C. as a result of the heat of reaction liberated.

220 parts per hour of a waxy low molecular weight polyethylene is obtained. Its physical data are:

| | |
|---|---|
| Mean molecular weight | 6050 |
| Softening range °C | 114 to 117 |
| Density g./ccm | 0.946 |
| Hardness (depth of penetration) mm | 0.17 |
| Oil-binding properties | Good |

EXAMPLE 3

A mixture compressed to 2200 atmospheres and consisting of (a) 1000 parts per hour of ethylene, (b) 50 moles per hour of diisopropyl peroxydicarbonate per million moles of ethylene, (c) 48 parts by volume per hour of oxygen per million parts by volume of ethylene and (d) 9 parts by volume of hydrogen (regulator) per hundred parts by volume of ethylene is charged into the reactor at the inlet end. The heat transfer medium in zone (I) of the reactor jacket is kept at a constant temperature of 110° C., and in zone (II) at 180° C. The reaction mixture reaches a temperature of about 200° C. as a result of the heat of reaction liberated.

150 parts per hour of a waxy low molecular weight polyethylene is obtained which has the following physical data:

| | |
|---|---|
| Mean molecular weight | 5100 |
| Softening range °C | 115 to 120 |
| Density g./ccm | 0.955 |
| Hardness (depth of penetration) mm | 0.14 |
| Oil-binding properties | Good |

Comparative Experiment

The procedure of Example 1 is followed exactly except that 100 moles per hour of diisopropyl peroxydicarbonate is used per million moles of ethylene and no oxygen is present.

Only 50 parts per hour of a waxy low molecular weight polyethylene is obtained which moreover has unsatisfactory oil-binding properties.

EXAMPLE 4

A mixture compressed to 2000 atmospheres and consisting of (a) 1000 parts per hour of ethylene, (b) 80 moles per hour of acetylcyclohexanesulfonyl peroxide per million moles of ethylene, (c) 120 parts by volume per hour of oxygen per million parts by volume of ethylene and (d) 7.0 parts by volume per hour of hydrogen (regulator) per hundred parts by volume of ethylene. The heat transfer medium in the reactor jacket is kept at a constant temperature of 95° C. in zone (I) and at 185° C. in zone (II). The reaction mixture reaches a temperature of about 195° C. as a result of the heat of reaction liberated.

168 parts per hour of a waxy low molecular weight polyethylene is obtained having the following physical data:

| | |
|---|---|
| Mean molecular weight | 6200 |
| Softening range °C | 113 to 116 |
| Density g./ccm | 0.946 |
| Hardness (depth of penetration) mm | 0.19 |
| Oil-binding properties | Good |

EXAMPLE 5

A mixture of (a) 1000 parts per hour of ethylene, (b) 30 moles per hour of tertiary-butyl peroxypivlate per million moles of ethylene, (c) 12 parts by volume per hour of oxygen per million parts by volume of ethylene and (d) 10.0 parts by volume of hydrogen (regulator) per hundred parts by volume of ethylene is fed into the reactor at the inlet end. The heat transfer medium in the reactor jacket is kept at a constant temperature of 120° C. in zone (I) and at 190° C. in zone (II). The reaction mixture reaches a temperature of about 245° C. as a result of the heat of reaction liberated.

240 parts per hour of a waxy low molecular weight polyethylene is obtained. Its physical data are as follows:

| | |
|---|---|
| Mean molecular weight | 5600 |
| Softening range °C | 121 to 123 |
| Density g./ccm | 0.950 |
| Hardness (depth of penetration) mm | 0.14 |
| Oil-binding properties | Good |

EXAMPLE 6

A mixture compressed to 3000 atmospheres and consisting of (a) 1000 parts per hour of ethylene,
(b) 15 moles per hour of tertiary-butyl peroxypivalate per million moles of ethylene,
(c) 20 parts by volume per hour of oxygen per million parts by volume of ethylene and
(d) 9.6 parts by volume per hour of hydrogen (regulator) per hundred parts by volume of ethylene is charged into the reactor at the inlet end. The heat transfer medium in the reactor jacket is kept at a constant temperature of 130° C. in zone (I) and at 200° C. in zone (II). The reaction material reaches a temperature of about 260° C. as a result of the heat of reaction liberated.

260 parts per hour of a waxy low molecular weight polyethylene is obtained. Its physical data are as follows:

| | |
|---|---|
| Mean molecular weight | 5200 |
| Softening range °C | 115 to 118 |
| Density g./ccm | 0.945 |
| Hardness (depth of penetration) mm | 0.17 |
| Oil-binding properties | Good |

We claim:

1. In a process for the production of waxy low molecular weight polyethylene in which ethylene is polymerized under the action of a free radical-forming polymerization initiator and a polymerization regulator at a temperature of from 50° to 350° C. and a pressure of from 1000 to 4000 atmospheres, the improvement which comprises using conjointly as the free radical-forming initiator:

(1) from 3 to 150 moles (per million moles of ethylene) of an organic peroxide having a half-life temperature of from 60° to 112° C.: and (2) from 5 to 250 parts by volume (per million parts by volume of ethylene) of oxygen.

2. A process as in claim 1 carried out at a temperature of from 80° to 300° C.

3. A process as in claim 1 carried out at a pressure of from 1300 to 3000 atmospheres.

4. A process as in claim 1 wherein the amount of component (1) is 5 to 80 moles.

5. A process as in claim 1 wherein the amount of component (2) is 10 to 120 parts by volume.

References Cited

UNITED STATES PATENTS

| | | | |
|---|---|---|---|
| 3,557,074 | 1/1971 | Bucchner et al. | 260—94.9 R |
| 2,387,755 | 10/1945 | Hanford | 260—94.9 R |

JOSEPH L. SCHOFER, Primary Examiner

A. HOLLER, Assistant Examiner

UNITED STATES PATENT AND TRADEMARK OFFICE
CERTIFICATE OF CORRECTION

PATENT NO. : 3,835,107
DATED : Issued September 10, 1974
INVENTOR(S) : Kurt Stark, Hans Gropper, Friedrich Urban and Helmut Pfannmueller It is certified that error appears in the above-identified patent and that said Letters Patent are hereby corrected as shown below:

In Column 1, in the heading, insert --Claims priority, Application German, October 15, 1969, P 19 51 879.7--.

Signed and Sealed this twenty-fifth Day of November 1975

[SEAL]

Attest:

RUTH C. MASON
Attesting Officer

C. MARSHALL DANN
Commissioner of Patents and Trademarks